(12) United States Patent
Birrell et al.

(10) Patent No.: US 8,512,114 B2
(45) Date of Patent: Aug. 20, 2013

(54) DOUBLE SHEAR MATERIAL CHOPPER

(75) Inventors: Stuart J. Birrell, Ames, IA (US); Benjamin J. Schlesser, Davenport, IA (US); Mark D. Dilts, Sioux Falls, SD (US)

(73) Assignee: Iowa State University Research Foundation, Inc., Ames, IA (US)

( * ) Notice: Subject to any disclaimer, the term of this patent is extended or adjusted under 35 U.S.C. 154(b) by 1043 days.

(21) Appl. No.: 12/062,860

(22) Filed: Apr. 4, 2008

(65) Prior Publication Data

US 2008/0268928 A1 Oct. 30, 2008

Related U.S. Application Data

(60) Provisional application No. 60/910,244, filed on Apr. 5, 2007.

(51) Int. Cl.
 *A01F 12/40* (2006.01)
(52) U.S. Cl.
 USPC ........................................................ 460/112
(58) Field of Classification Search
 USPC ............. 460/112, 69, 70, 80, 71, 66, 79, 119, 460/63, 121, 72; 241/294, 221, 242, 291, 241/293; 56/14.6, 14.5
 See application file for complete search history.

(56) References Cited

U.S. PATENT DOCUMENTS

| | | | |
|---|---|---|---|
| 602,659 A | 4/1898 | Gray | |
| 786,239 A | 3/1905 | Stone | |
| 1,195,320 A | 8/1916 | Zickefoose | |
| 1,628,461 A | 5/1927 | Grossman | |
| 2,334,461 A * | 11/1943 | Welty | 460/72 |
| 2,500,040 A | 3/1950 | McKahin | |
| 2,524,603 A | 10/1950 | Rosenthal | |
| 2,708,582 A | 5/1955 | Adams | |
| 2,974,465 A | 3/1961 | Snow | |
| 3,342,230 A * | 9/1967 | Waldrop | 241/56 |
| 3,357,467 A * | 12/1967 | Morkoski | 241/32 |

(Continued)

FOREIGN PATENT DOCUMENTS

| | | | |
|---|---|---|---|
| DE | 19530028 A1 * | 2/1997 | |
| DE | 10133886 C1 * | 9/2002 | |
| EP | 1261250 B1 | 9/2004 | |

OTHER PUBLICATIONS

Shinners et al., "Single-Pass, Split-Stream Harvest of Corn Grain and Stover", Transactions of the ASABE, vol. 50 (2):355-363 (2007).

(Continued)

*Primary Examiner* — Árpád Fábián-Kovács
(74) *Attorney, Agent, or Firm* — McKee, Voorhees & Sease, P.L.C.

(57) ABSTRACT

A material chopper may include a counter shear bar, a plurality of stationary knives associated with the counter shear bar, a shaft, at least one rotor section operatively connected to the shaft, each of the at least one rotor section configured to rotate with the shaft, at least one knife holder in each of the at least one rotor section, at least one knife operatively connected to each of the at least one knife holder, and slots in each of the at least one knife holder, wherein edges of the slot provide counter shear surfaces for the plurality of stationary knives. The material chopper may be added to or incorporated into a harvesting machine such as a combine.

21 Claims, 11 Drawing Sheets

(56) References Cited

U.S. PATENT DOCUMENTS

| | | | |
|---|---|---|---|
| 3,389,732 A | 6/1968 | Waldrop | |
| 3,713,471 A * | 1/1973 | Sadler | 83/523 |
| 3,717,062 A * | 2/1973 | Gaeddert | 241/292.1 |
| 3,815,823 A * | 6/1974 | Johnson | 239/650 |
| 3,974,970 A * | 8/1976 | Bertrand et al. | 241/222 |
| 4,061,284 A | 12/1977 | Raisbeck | |
| 4,209,137 A * | 6/1980 | McAllister et al. | 241/221 |
| 4,257,566 A * | 3/1981 | Lawrence | 241/221 |
| 4,591,102 A | 5/1986 | Clarke | |
| 4,600,019 A | 7/1986 | McBroom | |
| 5,161,356 A * | 11/1992 | Pick | 56/60 |
| 5,232,405 A * | 8/1993 | Redekop et al. | 460/112 |
| 5,269,126 A * | 12/1993 | Kalverkamp | 56/60 |
| 5,413,286 A * | 5/1995 | Bateman | 241/190 |
| 5,482,508 A | 1/1996 | Redekop | |
| 5,542,883 A * | 8/1996 | Cruson | 460/112 |
| 5,544,826 A * | 8/1996 | Klingler et al. | 241/242 |
| 5,704,562 A * | 1/1998 | Wagstaff | 241/294 |
| 5,779,167 A * | 7/1998 | Wagstaff | 241/242 |
| 5,878,970 A * | 3/1999 | Leeb | 241/294 |
| 5,928,080 A | 7/1999 | Jakobi | 460/112 |
| 5,941,469 A * | 8/1999 | Spiegemacher | 241/291 |
| 6,120,373 A | 9/2000 | Schrattenecker | |
| 6,126,098 A | 10/2000 | Schrattenecker | |
| 6,152,820 A * | 11/2000 | Heidjann et al. | 460/112 |
| 6,196,483 B1 * | 3/2001 | Jakobi | 241/101.763 |
| 6,251,009 B1 | 6/2001 | Grywacheski | |
| 6,325,714 B1 * | 12/2001 | Tanis et al. | 460/71 |
| 6,354,938 B1 | 3/2002 | Schrattenecker | |
| 6,358,141 B1 | 3/2002 | Stukenholtz | |
| 6,405,954 B1 * | 6/2002 | Pakura | 241/294 |
| 6,478,674 B2 * | 11/2002 | Redekop | 460/112 |
| 6,511,374 B2 * | 1/2003 | VanEe | 460/112 |
| 6,685,558 B2 | 2/2004 | Niermann | |
| 6,692,351 B2 * | 2/2004 | Johnson et al. | 460/112 |
| 7,028,932 B2 * | 4/2006 | Lucas et al. | 241/101.8 |
| 7,044,853 B2 | 5/2006 | Weichholdt | |
| 7,104,883 B2 * | 9/2006 | Dow | 460/112 |
| 7,213,781 B2 * | 5/2007 | Pakura | 241/294 |
| 7,343,946 B2 * | 3/2008 | Stager | 144/176 |
| 7,544,127 B2 * | 6/2009 | Dow et al. | 460/112 |
| 2002/0103015 A1 * | 8/2002 | Gerber et al. | 460/112 |
| 2003/0154607 A1 * | 8/2003 | Hamptaux | 30/265 |
| 2008/0290198 A1 * | 11/2008 | Benes et al. | 241/88.4 |
| 2008/0293460 A1 * | 11/2008 | Benes | 460/21 |
| 2008/0293461 A1 * | 11/2008 | Benes et al. | 460/112 |
| 2008/0293462 A1 * | 11/2008 | Farley et al. | 460/112 |
| 2008/0305842 A1 * | 12/2008 | Benes et al. | 460/112 |

OTHER PUBLICATIONS

Shinners et al., "Single-Pass, Split-Stream of Corn Grain and Stover", An ASABE Meeting Presentation, Portland, Oregon, Paper No. 061015 (2006).

* cited by examiner

DOUBLE SHEAR MATERIAL CHOPPER

CROSS-REFERENCE TO RELATED APPLICATIONS

This application claims priority under 35 U.S.C. §119 to provisional application Ser. No. 60/910,244 filed Apr. 5, 2007, herein incorporated by reference in its entirety.

GRANT REFERENCE

This invention was made with government support under Grant No. 68-3A75-4-137 awarded by USDA/NRCS and DOE. The Government has certain rights in this invention.

BACKGROUND OF THE INVENTION

The present invention relates generally to material chopping. To assist in providing a background of the invention problems associated with choppers used to produce stover are discussed. It is to be understood, however, that the present invention is not to be limited to this specific application.

Recently, increased interest has been placed on a stover. The term "stover" is generally the stalk and leaf materials of a crop without the harvested grain. Sometimes this is referred to as crop residue which is indicative of the relative value of stover compared to grain. However, it is now recognized that stover, a biomass material, can be used in ethanol production and thus has value beyond its traditional usage.

To use stover as a biomass material, it is desirable for the stover to be of a uniform length of cut. For this reason, improved chopper designs are needed. Two common chopper designs are the flail style chopper and the slicer/shear style chopper. The flail style chopper uses hammers attached a center drum to chop material. It relies on the impact of the hammer on the material to cut the material. The slicer/shear style chopper uses shear surfaces rotating on a center drum that pass near a bank of stationary knives to shear material. These types of chopper designs have major drawbacks. In particular, the flail style choppers do not provide a uniform length of cut and they require more power to operate than a shear style chopper. Slicer style choppers employ shear style cutting, but they do not have the ability to uniformly size material that is randomly oriented. Therefore, problems remain.

Therefore it is a primary object, feature, or advantage of the present invention to improve over the state of the art.

It is a further object, feature, or advantage of the present invention to provide a two axis crop residue chopper which may be used to cut crop residue for the purpose of harvesting biomass feed stock for conversion to ethanol or any other use.

It is a still further object, feature, or advantage of the present invention to provide a chopper that cuts crop residues on perpendicular planes.

Another object, feature, or advantage of the present invention is to provide more uniform cut length to chopped crop residue.

Yet another object, feature, or advantage of the present invention is to provide a chopper where the depth of cutting teeth control length of cut.

A further object, feature, or advantage of the present invention is to provide for cutting of material regardless of orientation of material at entrance to chopper.

Yet another object, feature, or advantage of the present invention is to allow for use of a knife and shear bar configuration to cut crop residue cleanly and with lower power requirements than alternative methods.

Another object, feature, or advantage of the present invention is to use stationary vertical knives between rotating shear knives to provide either standard impact cutting or shear cutting on the perpendicular plane.

Yet another object, feature, or advantage of the present invention is to provide chopped and sized crop residue suited for either crop residue harvest or for standard residue management practices.

It is another object, feature, or advantage of the present invention to reduce the power required to chop the stover.

Another object, feature, or advantage of the present invention is to increase stover density for transport by cutting stover into uniform, small particles.

One or more of these and/or other objects, features, or advantages of the present invention will become apparent from the specification and claims that follow. The present invention is not to be limited to or by these objects, feature or advantages.

BRIEF SUMMARY OF THE INVENTION

The double shear material chopper is a device designed to use shearing to reduce particle size of material fed through it. It was initially intended to reduce the particle size of corn stover being discharged from a combine harvester although alternative uses exist, including forage harvest equipment. The device has two sets of blades oriented perpendicular to one another, and each set of blades has associated counter shear surfaces to simultaneously produce shearing action in two directions. The reason that shearing in two directions is desirable is because it provides a means of uniformly sizing the corn stover.

According to one aspect of the present invention, a double shear chopper for chopping a material is provided. The double shear chopper includes a counter shear bar, a plurality of stationary knives associated with the counter shear bar, a shaft, at least one rotor section operatively connected to the shaft, each of the at least one rotor section configured to rotate with the shaft, at least one knife holder in each of the at least one rotor section, at least one knife operatively connected to each of the at least one knife holder, and slots in each of the at least one knife holder, wherein edges of the slot provide counter shear surfaces for the plurality of stationary knives.

According to another aspect of the present invention, a double shear chopper for chopping a material includes a counter shear bar, a plurality of stationary knives associated with the counter shear bar, a shaft, a plurality of rotor sections operatively connected to the shaft, and a plurality of knives operatively connected to each of the plurality of rotor sections. The adjacent rotor sections within the plurality of rotor sections are staggered to assist in reducing power requirements of the double shear chopper during cutting.

According to another aspect of the present invention, a harvesting machine is provided. The harvesting machine includes a self-propelled vehicle adapted for separating grain from stover and collecting the grain and a material chopper adapted for receiving the stover after the separating of the grain from the stover. The material chopper may include (a) a first set of blades, (b) a second set of blades oriented substantially perpendicularly to the first set of blades, (c) a first set of counter shear surfaces associated with the first set of blades, and (d) a second set of counter shear surfaces associated with the second set of blades. The first set of blades, the second set of blades, the first set of counter shear surfaces and the second set of counter shear surfaces provide shearing action in two directions to assist in providing uniformly sized particles of the stover.

According to another aspect of the present invention, a harvesting machine is provided. The harvesting machine includes a self-propelled vehicle adapted for separating grain from stover and collecting the grain, and a material chopper adapted for receiving the stover after the separating of the grain from the stover. The material chopper may include (a) a counter shear bar, (b) a plurality of stationary knives associated with the counter shear bar, (c) a shaft, (d) at least one rotor section operatively connected to the shaft, each of the at least one rotor section configured to rotate with the shaft, (e) a least one knife holder in each of the at least one rotor section, (f) at least one knife operatively connected to each of the at least one knife holder, and (g) slots in each of the at least one knife holder, wherein edges of the slot provide counter shear surfaces for the plurality of stationary knives.

According to another aspect of the present invention, a harvesting machine includes a self-propelled vehicle adapted for separating grain from stover and collecting the grain and a material chopper adapted for receiving the stover after the separating of the grain from the stover. The material chopper includes (a) a counter shear bar, (b) a plurality of stationary knives associated with the counter shear bar, (c) a shaft, (d) a plurality of rotor sections operatively connected to the shaft, and (e) a plurality of knives operatively connected to each of the plurality of rotor sections. The adjacent rotor sections within the plurality of rotor sections are staggered to assist in reducing power requirements of the double shear chopper during cutting.

According to another aspect of the present invention, a method for harvesting a crop is provided. The method includes separating grain from stover using a harvesting machine, collecting the grain using the harvesting machine, chopping the stover using a double shear chopper of the harvesting machine, and collecting the stover.

DETAILED DESCRIPTION OF THE PREFERRED EMBODIMENT

The double shear material chopper is a device designed to use shearing to reduce particle size of material fed through it. Its use is described with respect to reducing the particle size of corn stover being discharged from a combine harvester. It is to be appreciated that alternative uses exist including the chopping of any number of types of organic or inorganic material.

The double shear material chopper has two sets of blades oriented perpendicular to one another, and each set of blades has associated counter shear surfaces to simultaneously produce shearing action in two directions. The reason shearing in two directions is desirable is because it provides a means of uniformly sizing the material being chopped. Uniform sizing of material may be important in various applications. For example, uniform sizing of corn stover may be useful where the corn stover is further processed, such as for ethanol production. The double shear chopper reduces the particle size of the material being fed into it and has the ability to take randomly oriented material and chop it into uniform length pieces. In addition, the use of shear chopper instead of a flail chopper is advantageous as it reduces power requirements.

Figure 1:
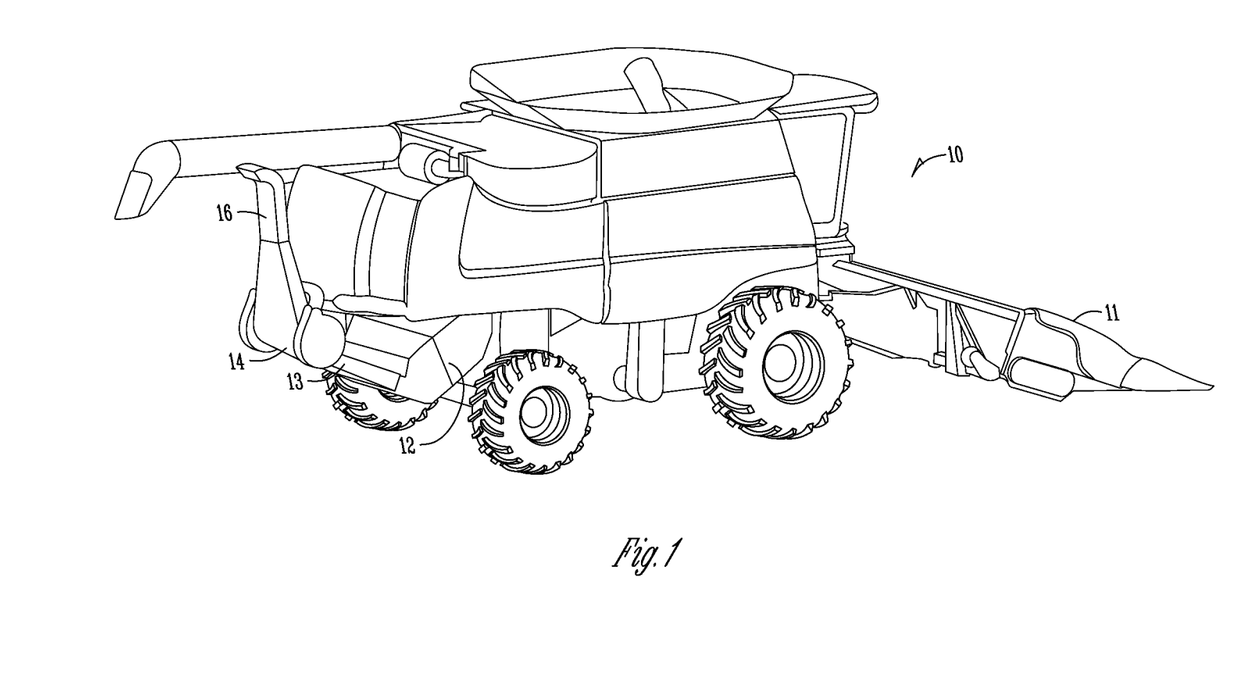
FIG. 1 illustrates one embodiment of a harvesting machine with a double shear material chopper of the present invention.

FIG. 1 illustrates one embodiment of the present invention. A harvesting machine 10 is shown which includes the chopper. The harvesting machine 10 may be based on a self-propelled combine such as a John Deere 9750STS combine. Such a combine includes a factory supplied flail style residue chopper, which is replaced with a double shear chopper. The self-propelled combine or other harvesting machine 10 provides for separating grain from stover and collecting the grain. A header 11 is shown on the front of the harvesting machine 10. In addition, a particle accelerator or silage blower 14 from a self-propelled forage harvester is mounted behind the chopper 12. The blower 14 may be from a John Deere 7500 self propelled forage harvester and is mounted on the back of the harvesting machine 10 immediately behind the chopper 12. Through the use of a deflector plate 13, all material flowing through the chopper 12 can be discharged either onto the ground or through the blower 14. If sent to the blower 14, the material may then be blown through the chute 16 into a wagon or truck or other container for collecting the stover. The wagon or truck or other container may then be removed from the field.

Figure 2:
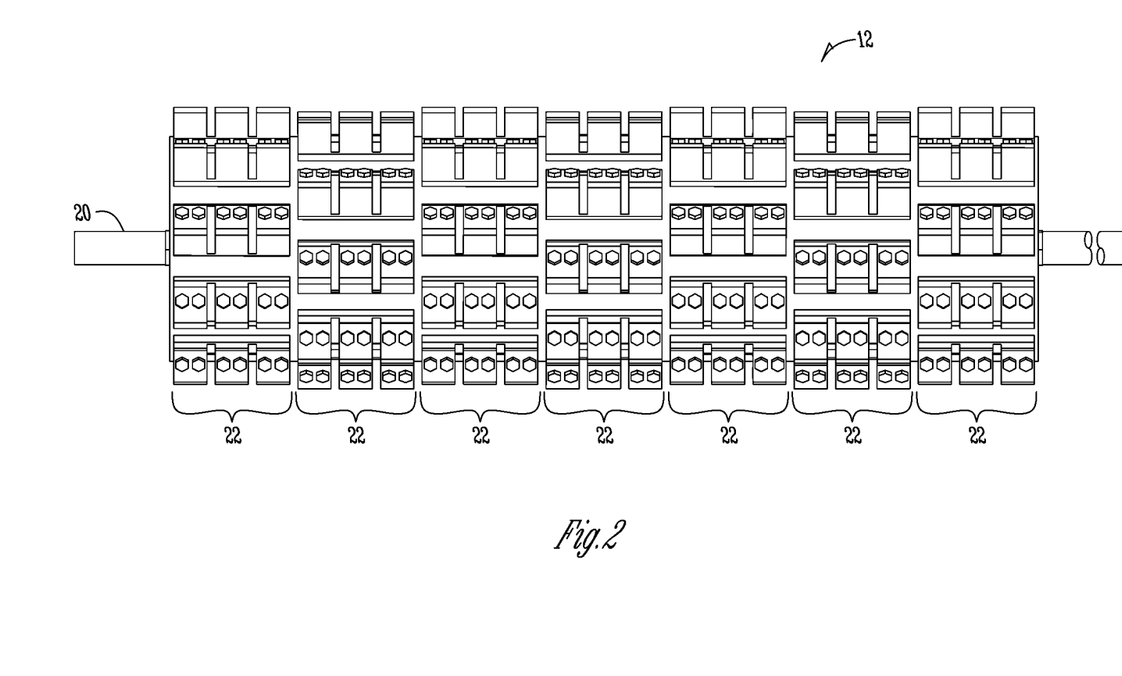
FIG. 2 illustrates one embodiment of a double shear chopper.

The double shear chopper 12 includes both a stationary section and rotor portions. FIG. 2 illustrates one embodiment of a double shear chopper 12. The chopper 12 shown includes seven double shear chopper rotor sections 22 which rotate around a shaft 20.

Figure 3:
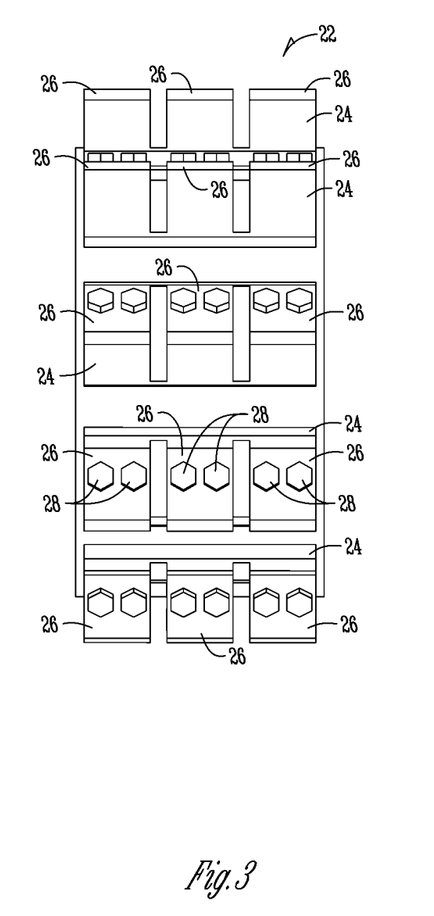
FIG. 3 is front view of one embodiment of a double shear chopper rotor section.
Figure 4:
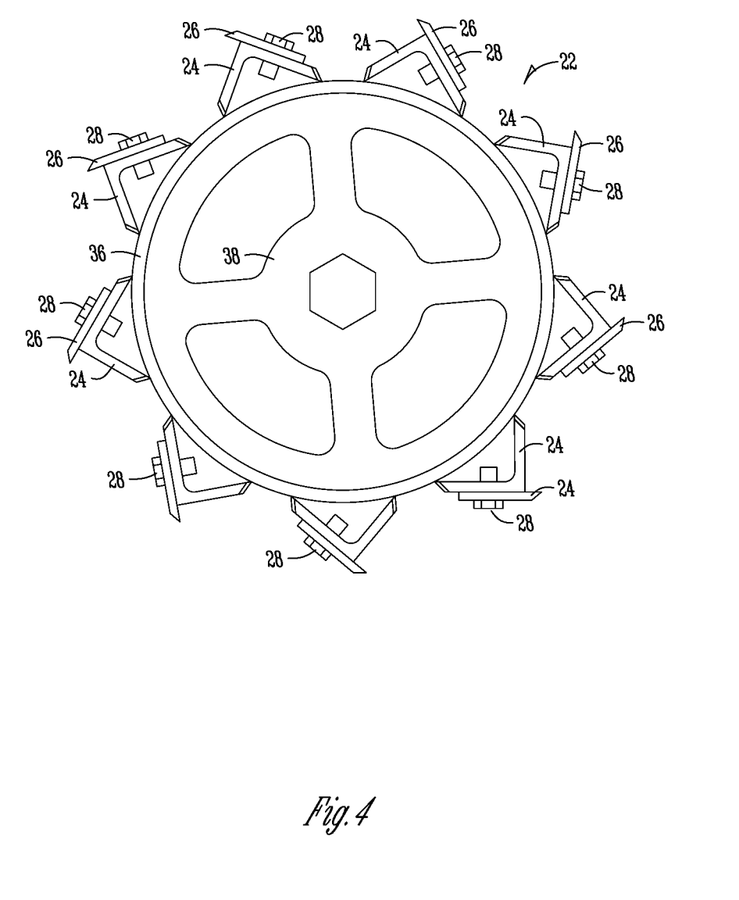
FIG. 4 is a side view of one embodiment of a double shear chopper rotor section.

FIG. 3 is a front view of one embodiment of a double shear chopper rotor section 22. Each section 22 has nine knife holders 24 distributed uniformly on the perimeter with three removable knives 26 per knife holder 24. Bolts 28 or other fasteners may be used to secure the knives 26 in the knife holders 24. The depth of the removable knives 26 may be adjusted to control cutting length. FIG. 4 is a side view of one embodiment of a double shear chopper rotor section 22. The knife holders 24 are distributed around a center tube 36. A center plate 38 is fit within the center tube 36 and fits to the shaft. The center tube 36 may have a 12-inch inside diameter and ⅜ (0.375) inch wall to give an outside diameter of 12.75 inches. The diameter at the top of the knives 26 may be approximately 17 inches.

Figure 5:
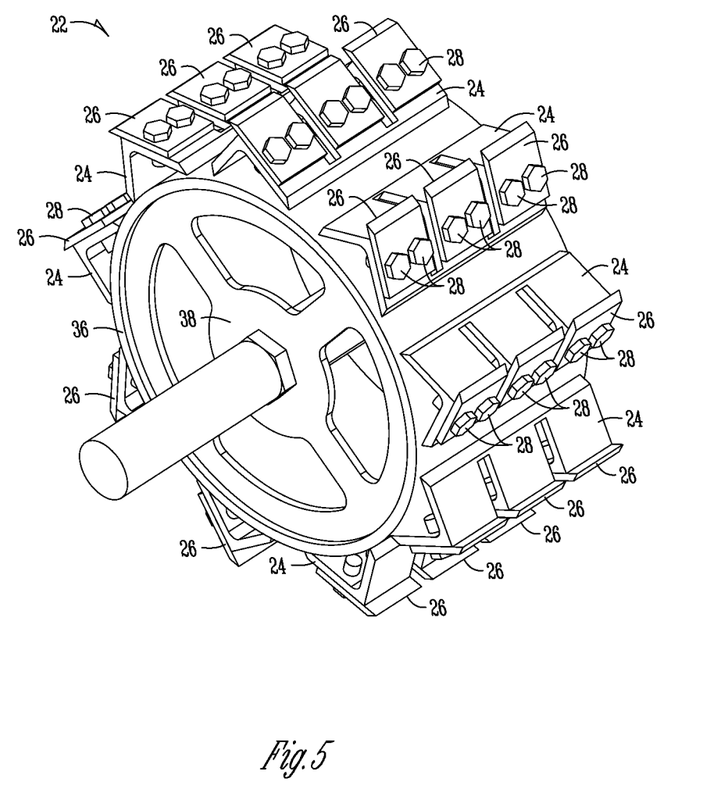
FIG. 5 is a perspective view of one embodiment of a double shear chopper rotor section.

FIG. 5 is a perspective view of a double shear chopper rotor section 22 placed on the shaft 20. The sections 22 are mounted on a two inch hex shaft 20 in order to make torque transmission and manufacturing easier. The hex shaft 20 allows the sections to be indexed at 60 degree increments. Each adjacent section was staggered 60 degrees from the next on the center shaft 20 in an effort to spread the timing of the cuts so as to distribute the chopper power requirement more uniformly and avoid slugging the chopper. By staggering the sections 22 in 60 degree increments on the center hex shaft 20, the knife holders 24 on adjacent sections are staggered by 20 degrees. That is, every 20 degrees that the shaft 20 rotates results in a cut.

Figure 6:
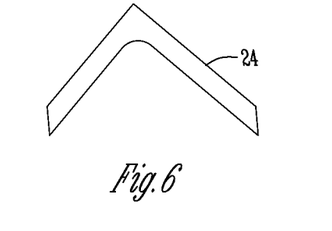
FIG. 6 is a side view of one embodiment of a knife holder.
Figure 7:
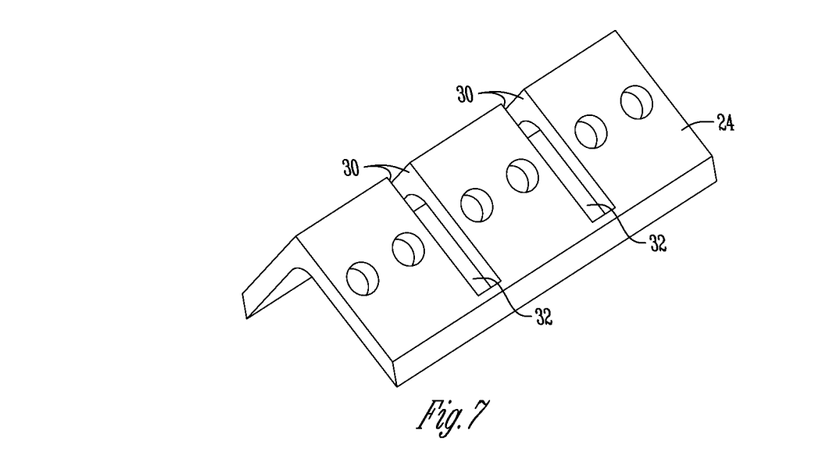
FIG. 7 is perspective view of one embodiment of a knife holder.
Figure 8:
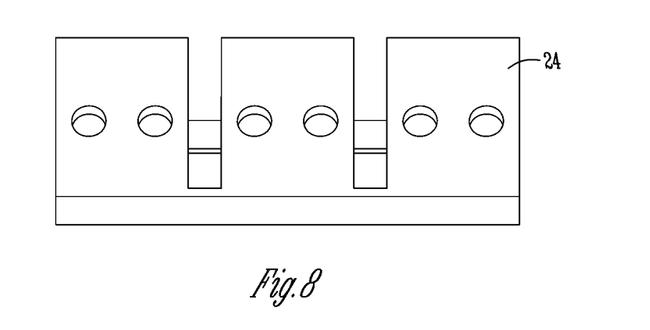
FIG. 8 is a front view of one embodiment of a knife holder.

FIG. 6 to FIG. 8 illustrate a knife holder 24. The knife holders 24 assist in the functioning of the double shear chopper. Each knife holder 24 holds three removable knives on the perimeter of the rotor drum. Also, the edges 30 of the slots 32 in the knife holder 24 serve as the counter shear surfaces for the stationary knives attached to the main counter shear bar. The dimensions of the knife holder are based on the nominal particle size desired. For example, the overall width of the holder may be seven inches with two half-inch slots 32 cut in the middle to allow for the stationary knives to pass through. The remaining portion of the holder 24 includes three two-inch sections connected only by strips of steel that were left uncut when waterjet cutting the slots. By leaving the strips intact, the half-inch spacing is maintained resulting in an easier and more uniform manufacturing practice. The knife holders 24 may be welded to the center tube 36 using a jig to hold them in position during assembly.

The knives 26 mounted to the rotor of the double shear chopper may be made from hardened steel to prevent excessive wear during use and may be cut using a waterjet cutting machine in order to avoid potentially negative heat effects during the cutting process. Each knife 26 may be two inches wide with two half-inch slots cut into it to fasten it to the knife holder 24. The cutting edge 40 may be cut with a waterjet cutting machine to a 40 degree angle.

The center of the double shear chopper as shown is a round steel tube with steel plates 38 welded to the center to transmit torque from the two-inch hex shaft driving the device to the knife blades.

Figure 9:
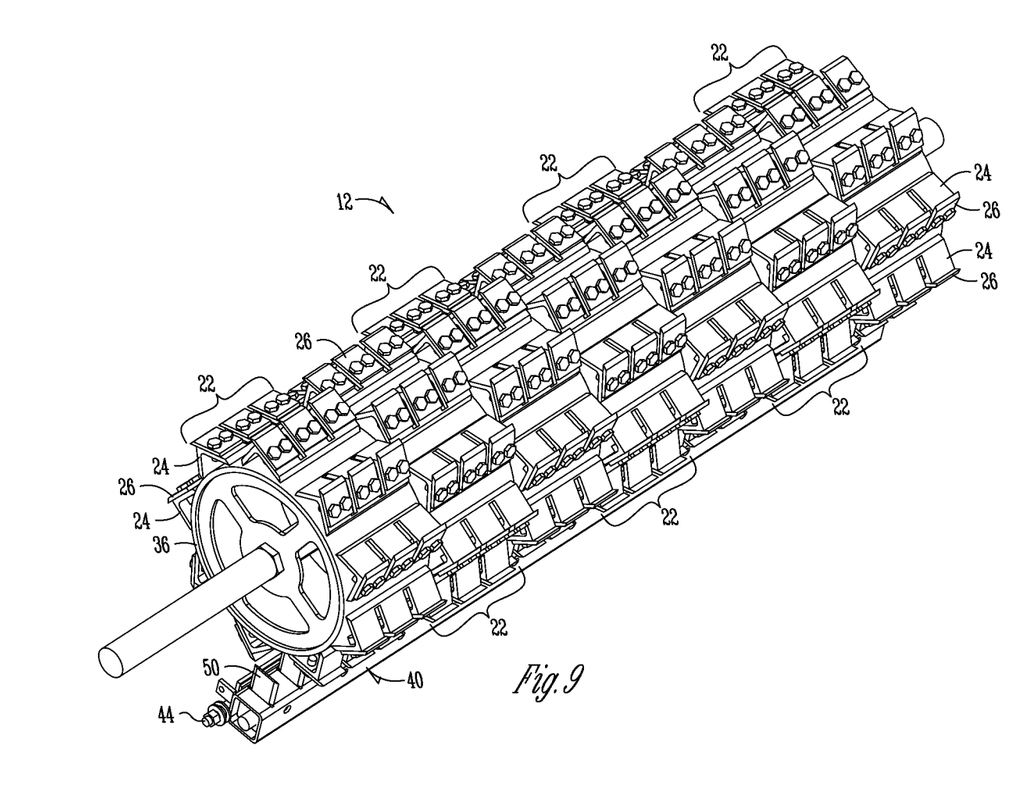
FIG. 9 is a perspective view of one embodiment of a double shear chopper.
Figure 10:
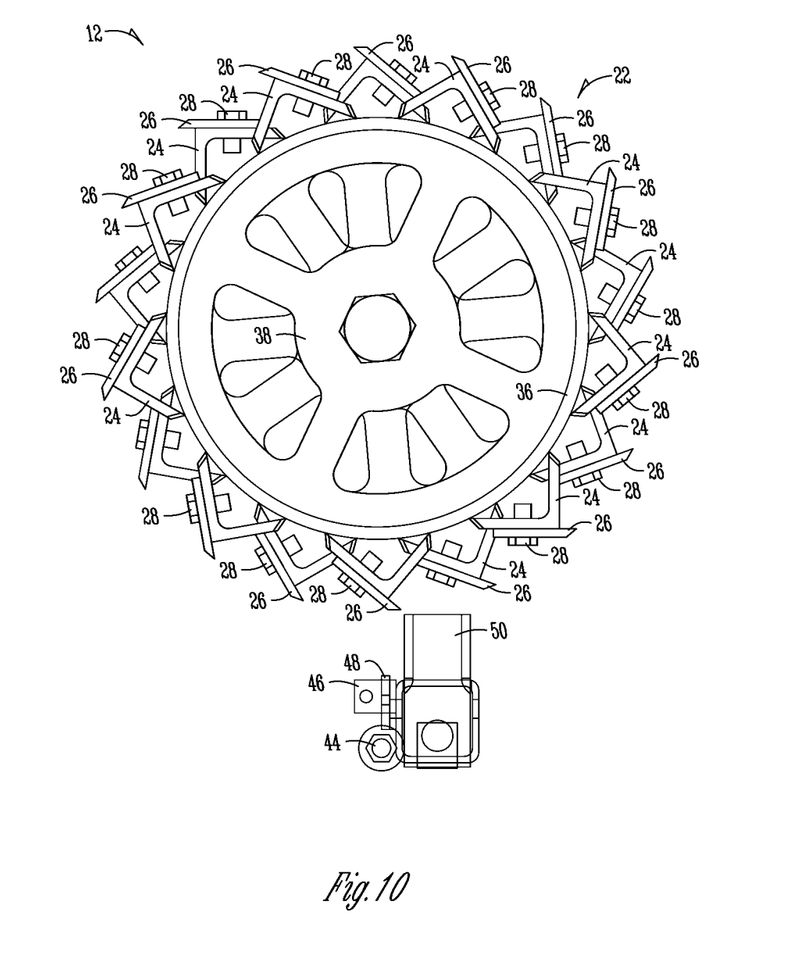
FIG. 10 is an end view of one embodiment of a double shear chopper.

FIG. 9 and FIG. 10 illustrate the double shear chopper 12 showing both sets of knives, including the rotating knives 22 and the stationary knives 50 on the counter shear bar 40. The knives 50 pass through the slots 32 cut into the knife holders 24. The edges of the slots 32 are close enough to the knives 50 to act as shear surfaces.

Figure 11:
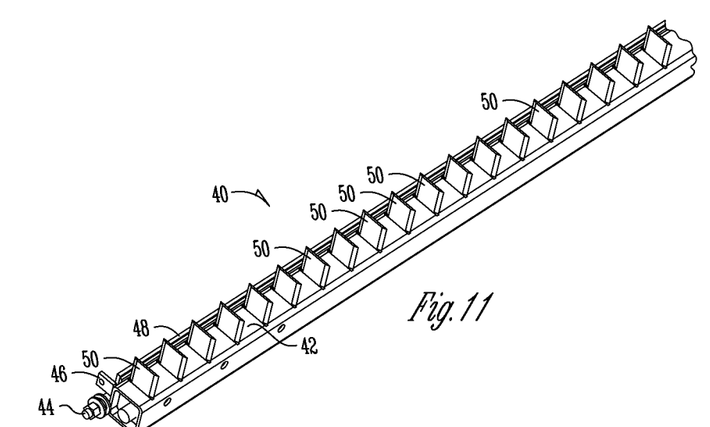
FIG. 11 is a perspective view of one embodiment of a counter shear bar.
Figure 12:
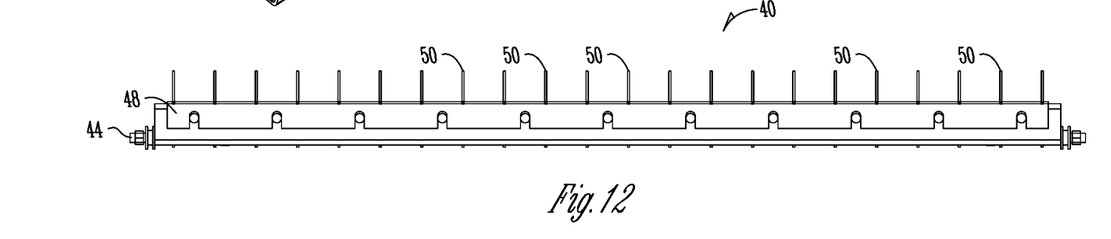
FIG. 12 is a front view of one embodiment of a counter shear bar.

FIG. 11 and FIG. 12 illustrate a counter shear bar 40. The counter shear bar 40 supports the material being cut. In the double shear chopper, counter shear surfaces are used for two sets of knives rather than just one set. For the knives mounted on the double shear chopper rotor, a piece of 0.25 inch by 1.625 inch hardened steel mounted to a support tube serves this purpose. The second set of knives 50 is positioned to cut material in a plane perpendicular to the first set. These knives 50 are mounted in the counter shear support tube 42 for the main counter shear 40. The counter shear surfaces for the second set of knives 50 are actually the knife holders on the perimeter of the chopper rotor. The second set of knives 50 pass through the slots cut into the knife holders. The edges of the slots are close enough to the knives to act as shear surfaces. FIG. 11 shows the components of the counter shear bar 40 including the main counter shear surface 48, the secondary knives 50, the support tube 42, and the mounting points including the primary mounting bolt 44 and the secondary mounting/shear bolt tab 46. The counter shear bar 40 may be attached to the chopper housing side panels with a bolt and busing to allow the bar to be rotationally adjusted for proper clearance with respect to the rotor. An additional mounting tab may be positioned on either end of the support bar to clamp the bar in position once properly adjusted. The bolt clamping 44 the bar passes through a slot in the housing side panels to accommodate any adjustments. The clamping bolt also acts as a shear bolt that may break and allow the counter shear bar to rotate away from the chopper rotor if an obstruction was present.

Figure 13:
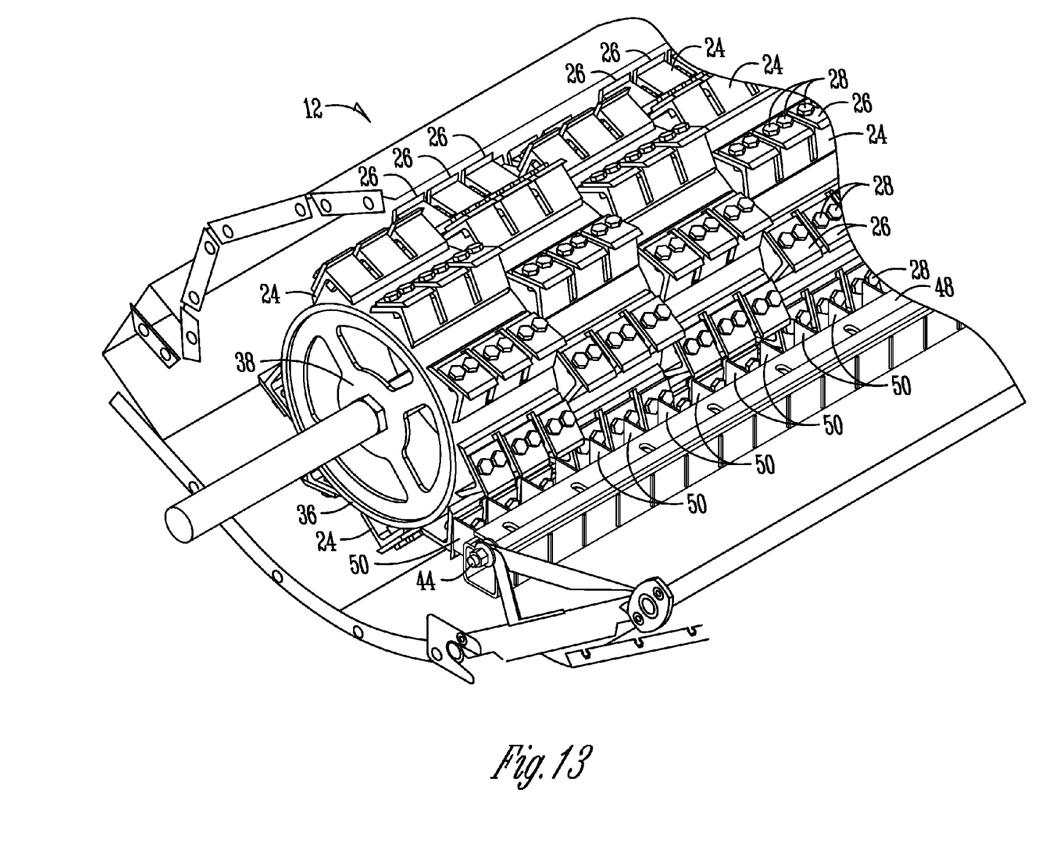
FIG. 13 is a perspective view of one embodiment of a double shear chopper.
Figure 14:
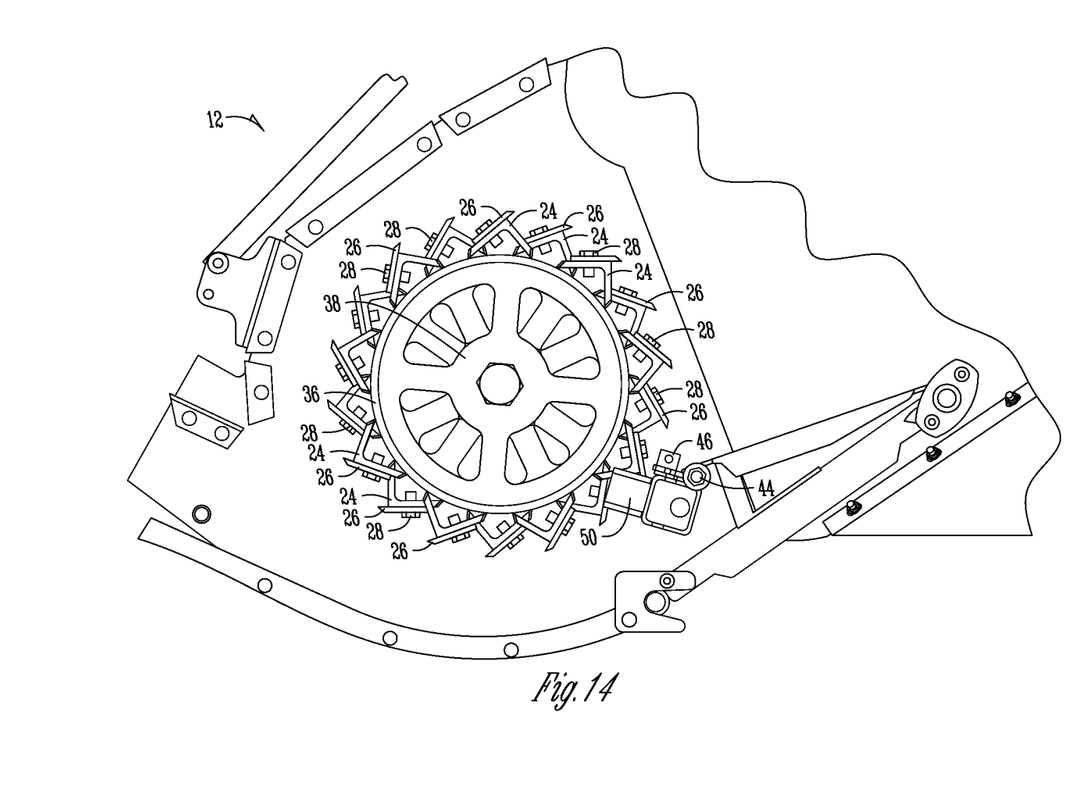
FIG. 14 is an end view of one embodiment of a double shear chopper housed in a housing.

FIG. 13 is a perspective view of one embodiment of a counter shear chopper 12. FIG. 13 illustrates interaction between the two different sets of knives. Note that the knives 26 pass across the counter shear bar 40 while the knives 50 pass through the slots 32 cut into the knife holders 24. The edges of the slots 32 are close enough to the knives 50 to act as shear surfaces. Thus, the counter shear bar 40 provides a first set of counter shear surfaces for the knives 26 while the edges of the slots 32 of the knifeholders 24 provide a a second set of counter shear surfaces. Thus, shearing action in two directions is provided to assist in providing uniformly sized particles of the material. FIG. 14 is an end view of the counter shear chopper 12 showing the counter shear chopper 12 housed in a housing such as present in a harvesting machine.

The device of the present invention has been experimentally tested. For testing purposes, approximately 20 acres of a generic corn hybrid were used in this experiment. The field consisted of straight rows that were approximately half of a mile long. The field was randomly divided into plots nominally 350 feet long and either 15 or 30 feet wide depending on combine header being used. The combine harvester being used as the basis for these tests was a John Deere 9750 STS combine. Two different choppers were tested on the combine along with two different headers. The first chopper was the John Deere flail style chopper that is commercially available on the 9750 STS. The second was the double-shear chopper. Both of these choppers were tested with a conventional and a row crop header mounted on the combine to determine their performance under a range of operating conditions. The conventional header is a John Deere 1293 12 row (30 ft) header designed to snap the ears off the corn plant and reduce the amount of stover and residue allowed to enter the combine. The row crop header is a John Deere 653A 6 row (15 ft) header that cuts the corn plant and conveys the entire plant into the combine, thus maximizing the amount of stover harvested. The purpose of using two different size headers was to maintain similar amounts of stover being run through the chopper regardless of the head being used. That is, the conventional head naturally pulls less material into the combine than the row crop head, but by being twice as large, it still provides approximately the same amount of material into the combine and ultimately the chopper. A blower from a John Deere 7500 self propelled forage harvester was also mounted on the back of the combine immediately behind the chopper. Through the use of a deflector plate, all material flowing through the chopper could be discharged either onto the ground or through the blower. If sent to the blower, the intention would be to blow the material into a wagon or truck or other container to be removed from the field. In addition to the two headers and two choppers being used, the tests were conducted both with and without the blower, in triplicate, and at three different ground speeds (1, 2, and 3 mph) for a total of 72 runs.

The choppers and blower were hydraulically driven with pressures and speeds being recorded to allow calculation of the power required for each test combination. In addition, samples of corn grain and stover were collected for moisture and particle size characterization. Moistures can be determined by following ASABE standards for drying each. Particle size can be characterized by following guidelines given in the ASABE standard Method of Determining and Expressing Particle Size of Chopped Forage Materials by Screening. Screens of various sizes may be used to sort the stover into size length categories.

Using hydraulic pressures and the rotational speed of the choppers allows calculation of the power required to operate the chopper under various conditions. By performing tests with both the double shear chopper and the conventional flail type chopper, a direct comparison was made between the power requirements of each under similar conditions. Generally, the double shear chopper required less power then the conventional flail type chopper as expected.

Visual analysis of the stover discharged from the double shear material chopper revealed several notable observations. First, most of the stalk material was cut into lengths of two inches or smaller. Second, the cobs were also consistently cut into pieces of two inches or smaller. Third, the husks that were discharged from the shear chopper were much larger pieces than the remaining material and those pieces were larger than the desired two inch cut length. It is believed that because the husk material is not rigid it was able to pass through certain areas of the double shear material chopper without significant size reduction, including the gap between the knives on the chopper rotor are wider than the counter shear bar. To reduce this effect, these gaps may be reduced. In addition, higher speeds may reduce this effect as the husks would have less time to flex.

A double shear material chopper has now been disclosed. It is to be understood that the present invention is not to be limited to the specific embodiments described here as variations in size, form, structure, and features are contemplated. It is to be further understood that the double shear material chopper although described in the context of chopping stover may also be used to chop other types of materials. These and other variations, options, and alternatives are within the spirit and scope of the invention.

What is claimed is:

1. A double shear chopper for chopping a material, comprising:
    a counter shear bar having a main counter shear surface;
    a plurality of stationary knives associated with the counter shear bar;
    a shaft;
    at least one rotor section operatively connected to the shaft, the at least one rotor section configured to rotate with the shaft;
    at least one knife holder in each of the at least one rotor section;
    at least one knife operatively connected to each of the at least one knife holder;
    slots in each of the at least one knife holder, wherein opposite edges of each of the slots provide counter shear surfaces for the plurality of stationary knives; and
    the main counter shear surface of the counter shear bar providing a counter shear surface for each of the at least one knife.

2. The double shear chopper of claim 1 wherein each of the at least one knife being operatively connected to each of the at least one knife holder with a bolt to facilitate convenient replacement of one or more of the at least one knife.

3. The double shear chopper of claim 1 wherein the at least one rotor section comprises a plurality of rotor sections with adjacent of the rotor sections staggered around the shaft to assist in reducing power requirements of the double shear chopper during cutting.

4. The double shear chopper of claim 1 wherein the at least one rotor section comprises a plurality of rotor sections and wherein knife holders on adjacent rotor sections being staggered to assist in reducing the power requirements of the double shear chopper during cutting.

5. The double shear chopper of claim 1 wherein the counter shear bar provides a first set of counter shear surfaces while edges of the slots in each of the at least one knife holder provide a second set of counter shear surfaces to thereby provide shearing action in two directions to assist in providing uniformly sized particles of the material.

6. The double shear chopper of claim 1 wherein the at least one rotor section comprises a plurality of rotor sections and wherein each of the rotor sections being spaced apart sufficiently to pass through the plurality of stationary knives.

7. A double shear chopper for chopping a material, comprising:
    a counter shear bar having a main counter shear surface;
    a plurality of stationary knives associated with the counter shear bar;
    a shaft;
    a plurality of rotor sections operatively connected to the shaft;
    a plurality of knives operatively connected to each of the plurality of rotor sections;
    wherein the plurality of knives on adjacent rotor sections within the plurality of rotor sections being staggered to assist in reducing power requirements of the double shear chopper during cutting;
    wherein each of the plurality of rotor sections comprises a plurality of knifeholders for holding the plurality of knives;
    slots in each of the plurality of knife holders wherein opposite edges of each of the slots provide counter shear surfaces for the plurality of stationary knives; and
    the main counter shear surface of the counter shear bar providing a counter shear surface for each of the at least one knife.

8. A harvesting machine, comprising:
    a self-propelled vehicle adapted for separating grain from stover and collecting the grain;
    a material chopper adapted for receiving the stover after the separating of the grain from the stover;
    wherein the material chopper comprises (a) a first set of blades operatively connected to a rotor and held by knife holders, (b) a second set of blades operatively connected to a counter shear bar, the second set of blades oriented substantially perpendicularly to the first set of blades, (c) a first set of counter shear surfaces associated with the counter shear bar to provide shearing action with the first set of blades, (d) a second set of counter shear surfaces formed by opposite edges of slots within the knife holders holding the first set of blades, the edges of the slots providing shearing action with the second set of blades, (e) wherein the first set of blades, the second set of blades, the first set of counter shear surfaces and the second set of counter shear surfaces provide shearing action in two directions to assist in providing uniformly sized particles of the stover.

9. The harvesting machine of claim 8 further comprising a blower positioned rearwardly of the material chopper to receive the uniformly sized particles of the stover.

10. The harvesting machine of claim 9 further comprising a chute positioned rearwardly of the blower to convey the uniformly sized particles of the stover from the harvesting machine.

11. A harvesting machine, comprising:
    a self-propelled combine for separating grain from stover and collecting the grain;
    a material chopper adapted for receiving the stover after the separating of the grain from the stover; and wherein the material chopper comprises (a) a counter shear bar having a main counter shear surface, (b) a plurality of stationary knives associated with the counter shear bar, (c) a shaft, (d) at least one rotor section operatively connected to the shaft, each of the at least one rotor section configured to rotate with the shaft, (e) a least one knife holder in each of the at least one rotor section, (f) at least one knife operatively connected to each of the at least one knife holder, (g) slots in each of the at least one knife holder, wherein opposite edges of the slot provide counter shear surfaces for the plurality of stationary knives and (h) the main counter shear surface of the counter shear bar providing a counter shear surface for each of the at least one knife.

12. The harvesting machine of claim 11 further comprising a blower positioned rearwardly of the material chopper to receive the uniformly sized particles of the stover.

13. The harvesting machine of claim 12 further comprising a chute positioned rearwardly of the blower to convey the uniformly sized particles of the stover.

14. A harvesting machine, comprising:
a self-propelled combine for separating grain from stover and collecting the grain;
a material chopper adapted for receiving the stover after the separating of the grain from the stover; and
wherein the material chopper comprises (a) a counter shear bar having a main counter shear surface, (b) a plurality of stationary knives associated with the counter shear bar, (c) a shaft, (d) a plurality of rotor sections operatively connected to the shaft, (e) a plurality of knives operatively connected to each of the plurality of rotor sections to provide shearing action with the main counter shear surface of the counter shear bar, (f) each of the plurality of knives being held by a knife holder, each knife holder having at least one slot with opposite edges to provide shearing action with the stationary knives (g) wherein the knife holders on adjacent rotor sections within the plurality of rotor sections being staggered to assist in reducing power requirements of the double shear chopper during cutting.

15. The harvesting machine of claim 14 further comprising a blower positioned rearwardly of the material chopper to receive the uniformly sized particles of the stover.

16. The harvesting machine of claim 15 further comprising a chute positioned rearwardly of the blower to convey the uniformly sized particles of the stover.

17. A method for harvesting a crop, comprising:
separating grain from stover using a harvesting machine;
collecting the grain using the harvesting machine;
chopping the stover using a double shear chopper of the harvesting machine, the double shear chopper producing shearing action in two directions to assist in providing uniformly sized particles of the stover; and
collecting the stover;
wherein the double shear chopper comprises (a) a first set of blades operatively connected to a rotor and held by knife holders, (b) a second set of blades operatively connected to a counter shear bar, the second set of blades oriented substantially perpendicularly to the first set of blades, (c) a first set of counter shear surfaces associated with the counter shear bar to provide shearing action with the first set of blades, (d) a second set of counter shear surfaces formed by opposite edges of slots within the knife holders holding the first set of blades, the edges of the slots providing shearing action with the second set of blades, (e) wherein the first set of blades, the second set of blades, the first set of counter shear surfaces and the second set of counter shear surfaces produce shearing action in two directions to assist in providing uniformly sized particles of the stover.

18. The method of claim 17 wherein the step of collecting the stover includes blowing the stover from the harvesting machine.

19. A method of harvesting a crop, comprising:
separating grain from stover using a harvesting machine;
collecting the grain using the harvesting machine;
chopping the stover using a double shear chopper of the harvesting machine, the double shear chopper producing shearing action in two directions to assist in providing uniformly sized particles of the stover; and
collecting the stover;
wherein the double shear chopper comprises (a) a counter shear bar having a main counter shear surface, (b) a plurality of stationary knives associated with the counter shear bar, (c) a shaft, (d) at least one rotor section operatively connected to the shaft, each of the at least one rotor section configured to rotate with the shaft, (e) at least one knife holder in each of the at least one rotor section, (f) at least one knife operatively connected to each of the at least one knife holder to provide shearing action with the main counter shear surface of the counter shear bar, and (g) slots in each of the at least one knife holder, wherein opposite edges of each of the slots provide counter shear surfaces for the plurality of stationary knives.

20. A method for harvesting a crop, comprising:
separating grain from stover using a harvesting machine;
collecting the grain using the harvesting machine;
chopping the stover using a double shear chopper of the harvesting machine, the double shear chopper producing shearing action in two directions to assist in providing uniformly sized particles of the stover; and
collecting the stover;
wherein the double shear chopper comprises (a) a counter shear bar, (b) a plurality of stationary knives associated with the counter shear bar, (c) a shaft, (d) a plurality of rotor sections operatively connected to the shaft, (e) a plurality of knives operatively connected to each of the plurality of rotor sections, each of the plurality of knives having a single continuous blade (f) wherein each of the plurality of knives on adjacent rotor sections within the plurality of rotor sections being staggered to assist in reducing power requirements of the double shear chopper during cutting.

21. The method of claim 20 wherein the harvesting machine is a self-propelled combine.

* * * * *

UNITED STATES PATENT AND TRADEMARK OFFICE
CERTIFICATE OF CORRECTION

PATENT NO. : 8,512,114 B2  
APPLICATION NO. : 12/062860  
DATED : August 20, 2013  
INVENTOR(S) : Birrell et al.

It is certified that error appears in the above-identified patent and that said Letters Patent is hereby corrected as shown below:

In the Specification

Col. 1, Lines 12-14:
DELETE: "This invention was made with government support under Grant No. 68-3A75-4-137 awarded by USDA/NRCS and DOE. The Government has certain rights in this invention."

Col. 1, Lines 12-14:
ADD: --This invention was made with government support under Grant No. 68-3A75-4-137 awarded by USDA/NRCS and DOE and Grant No. 2009-10004-05147 awarded by USDA/NIFA. The Government has certain rights in this invention.--

Signed and Sealed this  
Twenty-sixth Day of November, 2013

Margaret A. Focarino  
*Commissioner for Patents of the United States Patent and Trademark Office*